(12) United States Patent
Agarwal et al.

(10) Patent No.: US 9,866,055 B2
(45) Date of Patent: Jan. 9, 2018

(54) AUTOMATIC SCHEME TO DETECT MULTI-STANDARD CHARGER TYPES

(71) Applicant: Cypress Semiconductor Corporation, San Jose, CA (US)

(72) Inventors: Rishi Agarwal, Santa Clara, CA (US); Nicholas Bodnaruk, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/974,804

(22) Filed: Dec. 18, 2015

(65) Prior Publication Data

US 2016/0372936 A1 Dec. 22, 2016

Related U.S. Application Data

(60) Provisional application No. 62/182,258, filed on Jun. 19, 2015, provisional application No. 62/218,324, filed on Sep. 14, 2015.

(51) Int. Cl.
*H02J 7/00* (2006.01)
*G06F 1/26* (2006.01)
*G06F 13/42* (2006.01)

(52) U.S. Cl.
CPC ............ *H02J 7/007* (2013.01); *H02J 7/0052* (2013.01); *G06F 1/266* (2013.01); *G06F 13/4282* (2013.01); *G06F 2213/3812* (2013.01); *G06F 2213/40* (2013.01); *H02J 2007/0001* (2013.01);

(Continued)

(58) Field of Classification Search
CPC .................. H02J 2007/0062; H02J 2007/0096
See application file for complete search history.

(56) References Cited

U.S. PATENT DOCUMENTS

| 5,844,400 | A | 12/1998 | Ramsier et al. |
| 6,191,552 | B1 | 2/2001 | Kates et al. |
| 6,236,186 | B1 | 5/2001 | Helton et al. |

(Continued)

FOREIGN PATENT DOCUMENTS

CA    2857863 A1    1/2015

OTHER PUBLICATIONS

Pericom Semiconductor Corporation, PI5USB2549 Data Sheet, "USB Charging Port Controller and Load Detection Power Switch," Aug. 27, 2014; 13 pages.

(Continued)

*Primary Examiner* — Samuel Berhanu
*Assistant Examiner* — Tarikh Rankine

(57) ABSTRACT

Techniques are described herein for detecting one of multiple (e.g., at least three) charger types that may be connected to a portable device. In response to detecting a charging device (e.g., a charger) of a particular charger type, the portable device is configured to charge its battery by drawing the maximum voltage and/or current that is/are allowed by the particular charger type. In an example embodiment, a portable device detects a Universal Serial Bus (USB) connection to a charging device and determines whether the charging device conforms to a first, second, or third charger type based on voltages on data lines of the USB connection. The portable device then charges its battery at maximum charging power available from the charging device according to the third charger type.

20 Claims, 6 Drawing Sheets

(52) U.S. Cl.
CPC ............... *H02J 2007/0062* (2013.01); *H02J 2007/0096* (2013.01)

(56) References Cited

U.S. PATENT DOCUMENTS

| | | | |
|---|---|---|---|
| 7,170,259 B2* | 1/2007 | Veselic | H02J 7/00 320/106 |
| 7,489,102 B2 | 2/2009 | Purdy et al. | |
| 8,179,161 B1* | 5/2012 | Williams | H03K 19/01759 326/82 |
| 2002/0178789 A1* | 12/2002 | Sunshine | G01N 29/022 73/31.06 |
| 2007/0188139 A1* | 8/2007 | Hussain | H02J 7/0073 320/128 |
| 2008/0126589 A1* | 5/2008 | Husain | G06F 3/023 710/14 |
| 2009/0182935 A1* | 7/2009 | Pizzarulli | G06F 13/4282 711/103 |
| 2011/0148470 A1* | 6/2011 | Inoue | G06F 13/4081 327/77 |
| 2012/0182255 A1* | 7/2012 | Kuang | G06F 3/0416 345/174 |
| 2012/0249054 A1 | 10/2012 | King et al. | |
| 2012/0306455 A1* | 12/2012 | Fischbach | H02J 7/0052 320/162 |
| 2013/0082644 A1* | 4/2013 | Gagne | H02J 7/00 320/107 |
| 2013/0113415 A1* | 5/2013 | Chen | B08B 3/022 320/107 |
| 2013/0217272 A1* | 8/2013 | Chung | H01R 13/6582 439/676 |
| 2016/0011238 A1* | 1/2016 | Kulkarni | G01R 17/02 320/137 |
| 2016/0282918 A1* | 9/2016 | Low | G06F 1/263 |

OTHER PUBLICATIONS

Texas Instruments, BQ24392 Data Sheet, "Charger Detection Device with High Speed USB Switch Battery Charger Specification v1.2," Jun. 2012; 18 pages.

* cited by examiner

AUTOMATIC SCHEME TO DETECT MULTI-STANDARD CHARGER TYPES

PRIORITY

This application claims the priority and benefit of U.S. Provisional Application No. 62/182,258, filed on Jun. 19, 2015, and U.S. Provisional Application No. 62/218,324, filed on Sep. 14, 2015, all of which are incorporated by reference herein in their entirety.

TECHNICAL FIELD

This disclosure generally relates to the field of battery charging for portable electronic devices.

BACKGROUND

Various portable electronic devices (e.g., such as smart phones, cell phones, tablets, etc.) utilize power provided by batteries and typically provide interfaces for recharging their batteries. Users have many options to charge their portable devices by coupling via USB ports to chargers or charging devices (e.g., such as computers, hubs, docking stations, wall chargers, car chargers, etc.). Some types of popular battery charging interfaces may be related to a given battery charging specification. Typically, better user experience is defined by shorter charging times. To this end some battery charging specifications define limits and control mechanisms to permit charging devices and portable devices to operate at currents and voltages in excess of the limits specified in a Universal Serial Bus (USB) specification, e.g., such as the USB Specification Revision 2.0 (published by USB-IF on Apr. 27, 2000). Some examples of such battery charging devices are defined in the Battery Charging Specification, Revision 1.2 (published on Dec. 7, 2010) ("BC1.2 Spec"), as well as in several proprietary specifications provided by various portable device manufacturers.

The existence in the market of different charging devices, however, presents various problems for users of portable devices. For example, when a portable device is connected to a charging device which does not correspond to its respective charging specification, the device may charge below the maximum limits allowed by the device's charging device, the device may not charge fully, or the device may not charge at all, thereby lowering the user experience.

DETAILED DESCRIPTION

Figure 1:
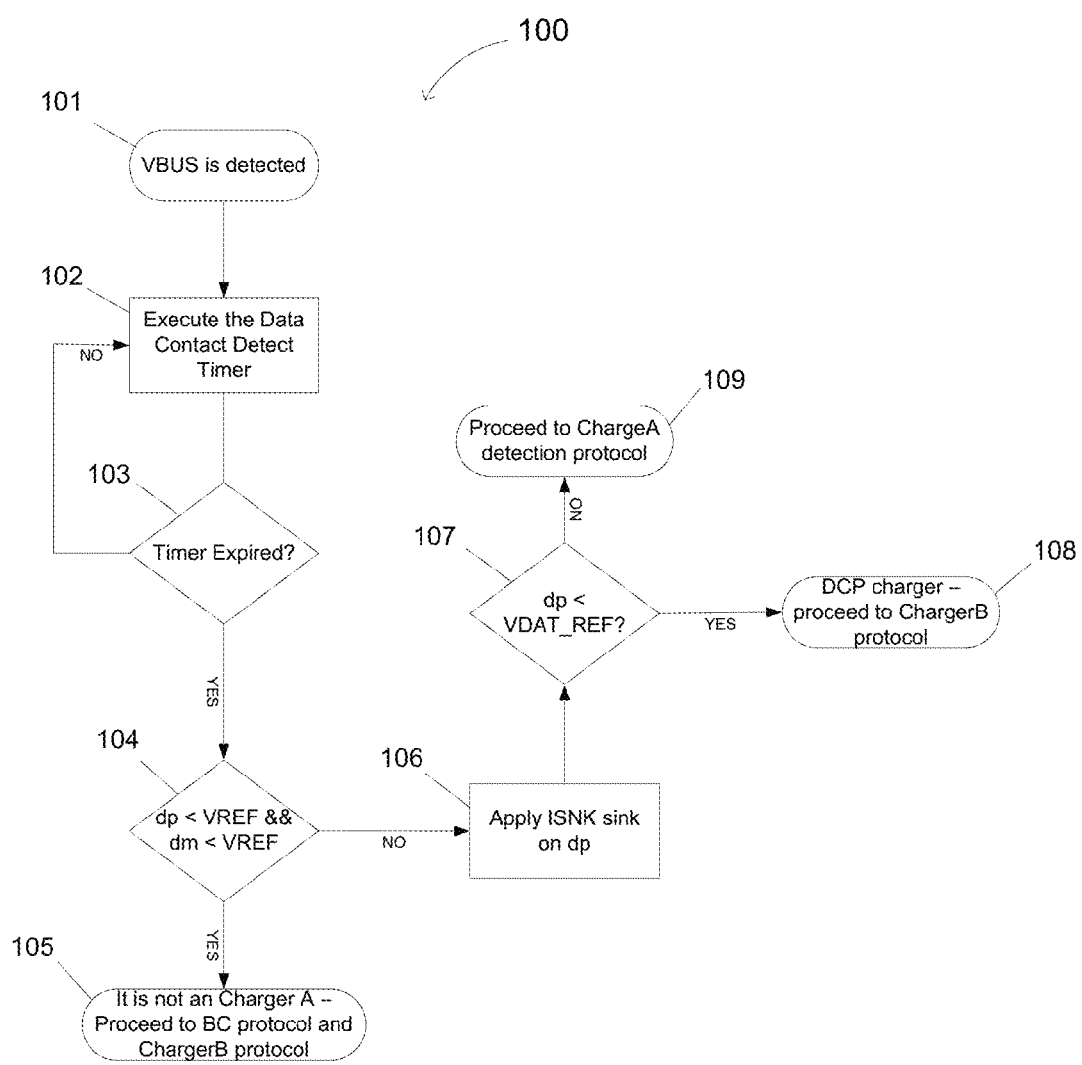
FIG. 1 illustrates an example method for detecting multi-standard charger types, according to some embodiments.

The following description sets forth numerous specific details such as examples of specific systems, components, methods, and so forth, in order to provide a good understanding of various embodiments of the techniques described herein for detection and control of charging devices, or chargers, conforming to multiple charger specifications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Overview

Described herein are various embodiments of techniques for controlling the charging of portable devices by coupling via USB ports to charging devices. Examples of such portable devices include, but are not limited to, tablets and tablet computers, e-reader devices, mobile communication devices (e.g., smart phones, cell phones, personal digital assistants, messaging devices, pocket PCs, etc.), wearable devices (e.g., smart watches, smart glasses, fitness bands, activity trackers, fashion electronics, etc.), audio/video/data recording and/or playback devices (e.g., cameras, voice recorders, hand-held scanners, monitors, etc.), and other similar electronic devices that can use battery-provided power to operate. Examples of such charging devices, also known as chargers, include, but are not limited to, computers, hubs, docking stations, AC chargers, car chargers, and other similar electronic devices that can provide power.

Some portable devices may be compliant with a given battery charging specification, while other portable devices may be non-compliant with such battery charging specification. As used herein, a portable device is referred to as "battery-charging" ("BC") compliant if the portable device complies with the requirements for dedicated charging specified in the BC1.2 specification. A portable device is referred to as BC non-compliant if the portable device does not comply with the requirements for dedicated charging specified in the BC1.2 specification. According to the BC1.2 specification, a portable device can draw up to a maximum of 1.5 A at a maximum of 5V to charge its batteries.

Alternately, other battery charging specifications may define other maximum charging currents or maximum charging voltages.

Some battery charging specifications (e.g., such as BC1.2 and various manufacturer-specific specifications) are closely related to USB specifications such as, for example, the USB Specification Revision 2.0 (published by USB-IF on Apr. 27, 2000), the USB 3.0 Specification Revision 1.0 (published by USB-IF on Nov. 12, 2008), and the USB 3.1 Specification Revision 1.0 (published by USB-IF on Jul. 26, 2013). The USB specifications generally define the characteristics (e.g., attributes, connector types, protocol definition, types of transactions, bus management, programming interfaces, etc.) of a differential serial bus that are required to design and build standard communication systems and peripherals. For example, a peripheral device (e.g., such as a portable device) connects to a host device via a USB port on the peripheral device and a USB port on the host device. The peripheral device may be directly attached to the host device or may be attached through USB connecting device such as a cable, dongle, or adaptor. A USB 2.0 port includes a power line of 5V (denoted VBUS), two data lines (denoted D+ or DP, and D− or DM), and a ground line (denoted GND). For backward compatibility with USB 2.0, a USB 3.0/3.1 port also provides the VBUS, D+, D−, and GND lines. Thus, a portable device can conveniently charge its battery by drawing current from the VBUS line of a USB 2.0/3.0/3.1 port on a device such as a computer, hub, docking station, AC charger, car charger, etc.

To permit portable devices to charge their batteries in a standard manner, the BC1.2 specification defines the maximum voltage and current limits of several different types of USB ports:

dedicated charging port (DCP)—this USB port can supply a maximum of 1.5 A of charging current at 5V to an attached portable device, but while charging the port does not participate in USB traffic (e.g., without completing USB enumeration to configure the portable device for USB communication);

charging downstream port (CDP)—this USB port can supply a maximum of 1.5 A of charging current at 5V to an attached portable device while participating in USB traffic (e.g., after USB enumeration is completed and the portable device is configured for USB communication);

standard downstream port (SDP)—this USB port can supply a maximum of 500 mA of charging current at 5V to an attached portable device while participating in USB traffic (e.g., after USB enumeration is completed and the portable device is configured for USB communication).

Some manufactures provide portable devices that are compliant with the BC1.2 specification, which allows charging devices from one manufacturer to be interoperable with portable devices by another manufacturer. Other manufacturers, however, provide portable devices that are not compliant with the BC1.2 specification but are otherwise compatible with the USB specifications for transfer of data. For example, one specific manufacturer provides portable devices that are configured to charge at up to 20V from a USB port that is otherwise compliant with the USB communication standards. In another example, one specific manufacturer provides portable devices that are configured to draw up to 2.4 A of charging current from a USB port that is otherwise compliant with the USB communication standards. As used herein, "charger type to" refers to a set of properties (e.g., characteristics, protocols, parameters, capabilities, etc.) defined in the particular charging specification to which a particular charging device conforms (e.g., BC compliant, type-1 specification, type-2 specification, etc). For example, a first charger type may be a set of properties defined in the BC1.2 specification, a second charger type may be a set of properties defined as "type-1" charging specification that provides for charging at least at higher currents than the BC1.2 specification, and a third charger type may be a set of properties defined as "type-2" charging specification that provides for charging at least at higher voltages than the BC1.2 specification.

While the capability to operate at higher charging current or higher charging voltage allows these BC non-compliant devices to charge their batteries faster, the presence of this capability causes some problems. For example, a user must make sure to plug a BC non-compliant portable device from a specific manufacturer into a USB port on a BC non-compliant charging device provided or supported by the respective manufacturer in order to get the faster charging time. The user, however, must make sure not to plug a BC compliant device (e.g., from another manufacturer) in the same USB port of the BC non-compliant charging device because the BC compliant device may be provided with more charging current or voltage than it is designed to handle, thereby causing various undesirable effects such as circuit burnouts and battery overheating.

In another example, the availability in the market of portable devices with the capability to draw higher charging currents and/or charging voltages than allowed in the BC1.2 specification presents a design problem for charging equipment manufacturers. For instance, charging equipment manufacturers face tough challenges and increased bill of materials (BOM) in designing charging devices that can charge most or all of the portable devices available in the market at the maximum limits allowed by the devices' respective (and possibly non-compliant) charging specifications, while at the same time being user-friendly by not requiring the user to select a certain type of USB port on the charging devices.

To address these and other problems, the techniques for controlling the charging of portable devices described herein provide, in some embodiments, for allowing a portable device to connect to a charging device, the portable device detecting whether the charging device corresponds to one of at least three charging specifications, the portable device then configurable to charge at the maximum charging voltage and/or current available from the charging device and allowable by the portable device.

Charging Device Identification Techniques

In some embodiments, the techniques described herein provide for configuring a portable device which is connected to a charging device though a USB port to detect whether the charging device conforms to the BC1.2 specification, a first charging specification for non-compliant currents ("type-1 specification"), or a second charging specification for non-compliant voltages ("type-2 specification"); the portable device is then configured to charge at its maximum charging voltage and/or current available from the charging device and allowable for the portable device.

FIG. 1 is a flow diagram illustrating a method 100 for implementing such techniques. The operations of the method in FIG. 1 are described as being performed by a portable device and/or a processing logic thereof, in accordance with an example embodiment. It is noted, however, that various implementations and embodiments may use various, and possibly different, components to perform the operations of the method in FIG. 1. Thus the description hereinafter, of the method in FIG. 1 is to be regarded in an illustrative rather than a restrictive sense.

Referring to FIG. 1, in operation 101, a USB port on portable device is connected to a USB port on a charging device over a suitable connecting device. In an embodiment, the portable device may be directly coupled to the charging device. In another embodiment, the portable device may be coupled to the charging device through a USB connecting device, for example a USB cable, adaptor, or dongle. The portable device and/or processing logic thereof and/or a circuit thereof is configured to execute the VBUS detect procedure as documented in the BC1.2 specification. When VBUS is detected, the portable device and/or the circuit thereof continues to operation 102.

In operation 102, the portable device and/or the circuit thereof is configured to execute the Data Contact Detect timer as documented in the BC1.2 specification.

In operation 103, the portable device and/or the circuit thereof is configured to check the expiration of the timer. If the timer has not expired, the portable device and/or the circuit thereof returns back to perform operation 102. Upon expiration of the Data Contact Detect timer, the portable device and/or the circuit thereof proceeds to operation 104.

In operation 104, the portable device and/or the circuit thereof is configured to compare the voltage dp on D+ to a reference voltage VREF, and compare the voltage dm on D− to the reference voltage VREF. VREF is a voltage in a range of approximately 0.8V-0.9V. In a preferred embodiment VREF is approximately 0.85V. If both dp and dm are less than VREF, the portable device and/or the circuit thereof proceeds to operation 105. If either dp or dm is not less than VREF, the portable device and/or the circuit thereof proceeds to operation 106.

In operation 105, the portable device and/or the circuit thereof is configured to identify the charging device as a BC compliant charging device (e.g., DCP, CDP, or SDP), or as a charging device that conforms to a type-2 specification, by executing the Primary and Secondary Detection procedures as documented in the BC1.2 specification and the detection procedure as documented in the type-2 specification. Based on the outcome of the procedures, the portable device is configured to charge at the maximum voltage and/or current available from the charging device and allowable for the device. In one example, a portable device connected to a SDP may be configured to draw 500 mA of current at 5V on VBUS. In another example, a portable device connected to a CDP or DCP may be configured to draw 1.5 A of current at 5V on VBUS. In another example, a portable device connected to a charging device that conforms to the type-2 specification may be configured to charge at least at a higher voltage (and possibly, at a higher current) than specified by the BC1.2 specification. In a particular embodiment, a portable device connected to a charging device that conforms to the type-2 specification may charge at up to 20V while drawing 500 mA on VBUS. In another embodiment, if the charging device does not meet BC1.2 specification and the type-2 specification, the portable device may be configured into a default configuration that allows the portable device to draw the standard 500 mA at 5V from the VBUS, as defined in the USB 2.0 specification.

In operation 106, the portable device and/or the circuit thereof is configured to apply a weak pulldown on D+. In the example shown, the weak pulldown is a sink current IDM_SINK as defined in the BC1.2 Specification. In another embodiment, the weak pulldown could be a large pulldown resistor approximately 175 kΩ. The portable device and/or the circuit thereof continues to operation 107.

In operation 107, the portable device and/or the circuit thereof is configured to compare the voltage dp on D+ to reference voltage VDAT_REF. VDAT_REF is defined in the BC1.2 specification. If dp is less than VDAT_REF, the portable device and/or the circuit thereof continues to operation 108. If dp is not less than VDAT_REF, the portable device and/or the circuit thereof continues to operation 109.

In operation 108, the portable device and/or the circuit thereof is configured to identify the charging device as a BC compliant charging device or as a charging device that conforms to the type-2 specification, by executing the Primary and Secondary Detection procedures as documented in the BC1.2 specification and the detection procedure as documented in the type-2 specification. Based on the outcome of the procedures, the portable device is configured to charge at the maximum voltage and/or current available from the charging device and allowable for the portable device. In one example, a portable device connected to a DCP may be configured to draw 1.5 A of current at 5V on VBUS. In another example, a portable device connected to a charging device that conforms to the type-2 specification may be configured to charge at least at a higher voltage (and possibly at a higher current) than specified by the BC1.2 specification. In a particular embodiment, a portable device connected to a charging device that conforms to the type-2 specification may charge at up to 20V while drawing 500 mA on VBUS. In another embodiment, if the charging device does not meet BC1.2 specification and the type-2 specification, the portable device may be configured into a default configuration that allows the portable device to draw the standard 500 mA at 5V from the VBUS, as defined in the USB 2.0 specification.

In operation 109, the portable device and/or the circuit thereof is configured to identify the charging device as a charging device that conforms to the type-1 specification. Then the portable device and/or the circuit thereof may continue by executing the detection procedure (if any) as documented in the type-1 specification. In one embodiment, if a portable device is connected to a charging device that conforms to the type-1 specification, the charging device may provide at least a higher current (and possibly a higher voltage) than specified by the BC1.2 specification. In a particular embodiment, a portable connected to a charging device that conforms to the type-1 specification may draw up to 2.4 A on VBUS while charging at 5V on VBUS. In another embodiment, if the charging device does not meet the type-1 specification, the portable device may be configured into a default configuration that allows the portable device to draw the standard 500 mA at 5V from the VBUS, as defined in the USB 2.0 specification.

In an embodiment, the method of FIG. 1 may be implemented by processing logic that comprises hardware circuitry and firmware on a single IC device, such as an IC device manufactured on a single die. In another embodiment, the method of FIG. 1 may be implemented by processing logic that comprises hardware circuitry and hardware on an IC device that is manufactured as a multi-chip module. In another embodiment, the method of FIG. 1 may be implemented on a system-on-chip (SOC) device that includes processing logic comprising circuits configured to perform the method of FIG. 1. Thus, the method of FIG. 1 is not limited to being performed by a particular type of IC device(s), and the specific examples of performing the method of FIG. 1 are provided heretofore in an illustrative rather than a restrictive sense.

Voltage Compare Circuitry

Figure 2:
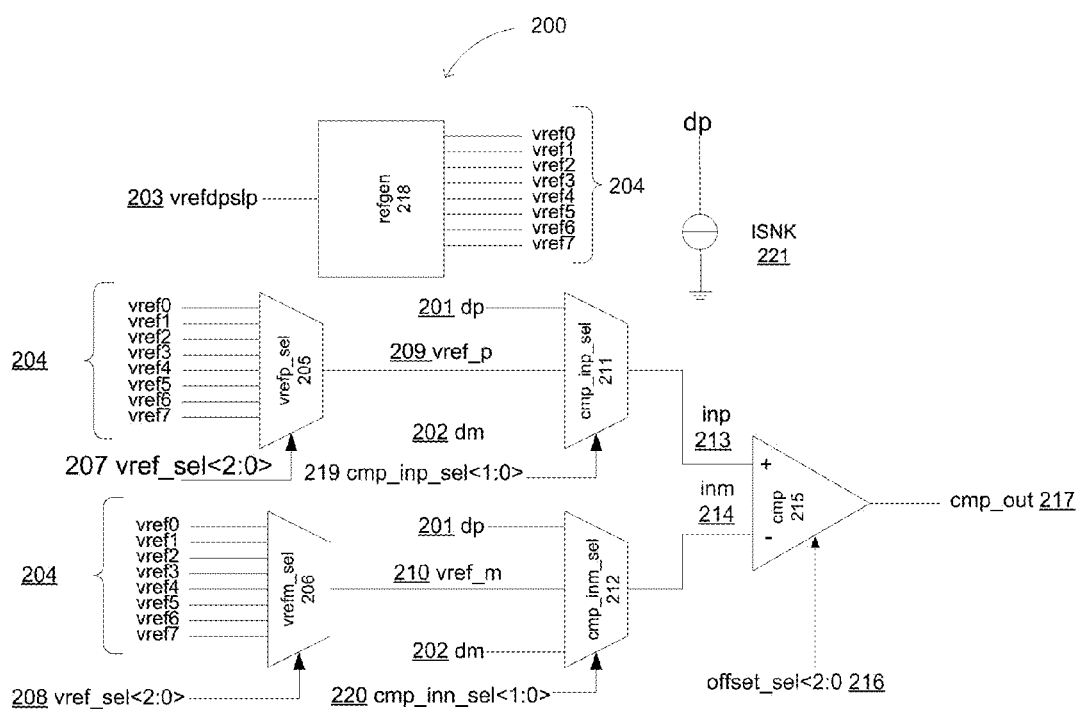
FIG. 2 illustrates example circuits in a controller configured for detecting multi-standard charger types, according to some embodiments.

FIG. 2 illustrates example circuitry 200 that is configured in accordance with the techniques described herein for comparing voltages including but not limited to dp, dm, VREF, and VDAT_REF. The operations of the circuitry in FIG. 2 are described in accordance with an example embodiment. It is noted, however, that various implementations and embodiments may use various, and possibly different, components to perform the operations of the method in FIG. 2. Thus the description hereinafter, of the circuitry in FIG. 2 is to be regarded in an illustrative rather than a restrictive sense.

In an embodiment, circuitry 200 is implemented in an (IC) device. In a specific embodiment, some or all of the circuitry of FIG. 2 is integrated on the same IC device comprising the hardware and/or firmware that implements the method 100 of FIG. 1. For example, the circuitry to implement method 100 and circuitry 200 may be a single-chip IC device from a family of USB controllers developed by Cypress Semiconductor Corporation, San Jose, Calif.

Among other components, circuitry 200 includes a voltage generator vrefgen 218, a multiplexer vrefp_sel 205, a multiplexer vrefn_sel 206, a multiplexer cmp_inp_sel 211, a multiplexer cmp_inn_sel 212, and a comparator cmp 215. It is noted that the multiplexers 205, 206, 211, and 212 are fully programmable. Circuitry 200 also includes current sink 221, which may be used to apply a weak pull down on the D+ line (e.g., during operation 106 of the method 100 illustrated in FIG. 1).

The voltage generator 218 takes a high precision voltage signal vrefpslp 203 and generates eight reference voltages vref0-7 204. Voltage signal 203 may be generated from a low power reference generator which supports the chip level deep sleep mode of operation. One of the voltages 204 equals reference voltage VREF. One of the voltages 204 equals reference voltage VDAT_REF. The other voltages 204 may equal reference voltages needed in the BC1.2 detection procedure, in a type-1 specification detection procedure, or in a type-2 specification detection procedure.

Voltages 204 are coupled to the inputs of the multiplexers 205 and 206. Control value vref_p_sel <2.0> 207 configures multiplexer 205 to select and couple one of the eight reference voltages 204 to input voltage vref_p 209 of multiplexer 211. Control value vref_m_sel <2.0> 208 configures multiplexer 206 to select and couple one of the eight reference voltages 204 to input voltage vref_m 210 of multiplexer 212. In one embodiment, vref_p and vref_m may be the same voltage; in another embodiment vref_p and vref_m may be different voltages. The timing and frequency at which the various reference voltages 204 are selected and coupled to multiplexers 205 and 206 may be configurable and controllable by firmware and/or hardware in the device.

Voltages dp 201 and dm 202 are coupled to multiplexers 211 and 212. Control value cmp_inp_sel <1.0> 219 configures multiplexer 211 to select and couple one of the three voltages dp, dm, or vref_p to input voltage inp 213 of comparator 215. Control value cmp_inn_sel <1.0> 220 configures multiplexer 212 to select and couple one of the three voltages dp, dm, or vref_n to input voltage inm 214 of comparator 215.

Comparator 215 compares the voltages inp 213 and inm 214. If voltage 213 is greater than voltage 214, comparator 215 produces a digital high signal on output cmp_out 217. If voltage 213 is less than voltage 214, comparator 215 produces a digital low on output 217.

Control value offset_sel <2.0> 216 may be used to compare the difference in the relative voltage levels of voltage 213 and voltage 214. The comparator 215 measures whether input voltage 213 is greater than input voltage 214 by a voltage level determined by control value 216. For example, control value 216 may be used to fine tune the voltage comparison executed by circuitry 200. Control value 216 may be configurable and/or programmable.

It is noted that in this embodiment a single voltage generator 218 and a single comparator 215 are used in the implementation of the method 100 of FIG. 1. Referring to FIG. 1, at operation 104, and the circuitry 200 of FIG. 2, one of the reference voltages 204 corresponding to VREF is coupled through multiplexer 205 and through multiplexer 211 to input 213 of comparator 215, while voltage dm 201 is coupled through multiplexer 212 to input 214 of comparator 215. In this configuration, circuitry 200 is used to compare voltage dm 202 to reference voltage VREF. At a later time, e.g., at operation 104, the circuitry 200 is used to compare voltage dp 201 to the reference voltage VREF. At a still later time, e.g., at operation 107, the circuitry 200 is used to compare dp to one of the reference voltages 204 corresponding to VDAT_REF. At still later times, e.g., at operations 105, 108, and 109, the circuitry 200 may be used to compare one or more of the reference voltages 204 to other voltages as needed to complete the charging device identification procedures as applicable.

In this embodiment illustrated in FIG. 2, a single voltage generator and a single comparator is required, thereby minimizing the die size and power consumed by the circuitry.

In alternate embodiments, different, components may perform the operations of the method in FIG. 2. In particular embodiments two or more comparators may be used to compare voltages, which may increase the die size and power consumed by the circuitry but may reduce the time required to complete the method as two or more voltage comparisons could be executed at the same time.

Example Operational Contexts

Figure 3:
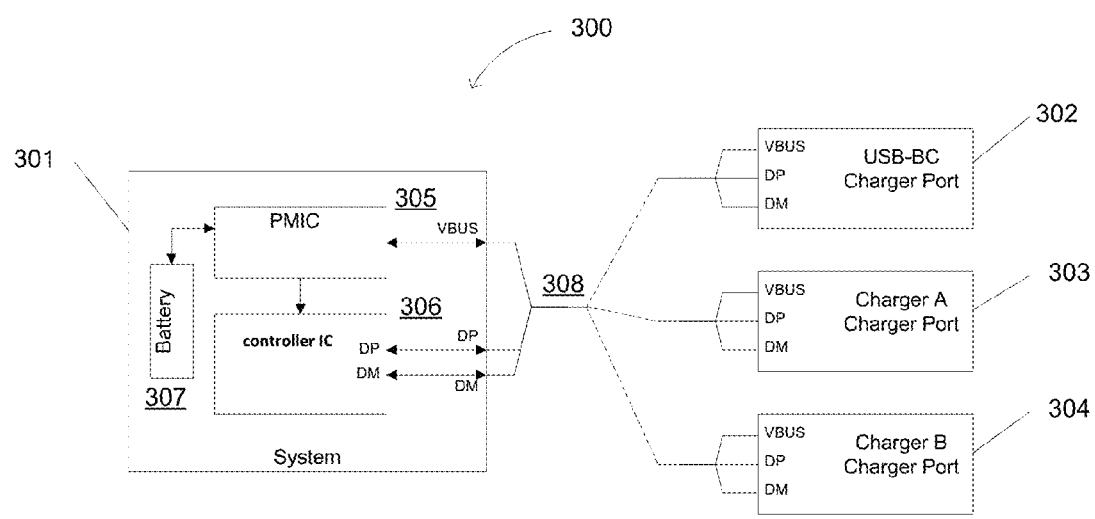
FIG. 3 illustrates an example system, according to some embodiments.

FIG. 3 illustrates an example operational context in which the techniques described herein for identifying the charging device by a portable device may be implemented. For example, FIG. 3 illustrates a portable device that can be connected to one of a plurality of charging devices in accordance with various embodiments. It is noted, however, that various implementations and embodiments may use various, and possibly different, components to operate in the context illustrated in FIG. 3. Thus the description hereinafter, of the operational context in FIG. 3 is to be regarded in an illustrative rather than a restrictive sense.

FIG. 3 illustrates a system 300 comprising a portable device 301 that may be connected over a connecting device 308 (e.g., such as USB connecting device) to one of a USB BC compliant charging device 302, a charging device complying with the type-1 specification 303, or a charging device complying with the type-2 specification 304. It will be noted that system 300 may comprise more or fewer charging devices.

The portable device 301 comprises a controller integrated device (controller IC) 306, a power management integrated circuit (PMIC) 305, and a battery 307. Controller IC 306 comprises circuitry to implement the method of FIG. 1. It is noted that in other embodiments a single IC may comprise the circuitry illustrated in FIG. 3 as controller IC 306 and PMIC 305.

Portable device 301 is coupled to one of the charging devices 302, 303, or 304 that may conform to the BC1.2 specification, a type-1 specification, or a type-2 specification, respectively. After performing the method of FIG. 1, portable device 301 determines to which one of charging devices 302, 303, or 304 it is connected, and the PMIC 305 configures portable device 301 to charge the battery 307 from the connected charging device by using the maximum allowable voltage and/or current available from the connected charging device and allowable by the portable device.

For example, when portable device 301 is connected over connecting device 308 to charging device 302, the controller 306 performs charger detection according to the techniques described herein, and detects that charger 302 is BC compliant. Controller 306 then configures portable device 301 (or causes device 301 to be configured) to draw the maximum voltage and current allowed by the BC specification and to charge battery 307 accordingly. In another example, when portable device 301 is connected over connecting device 308 to charger 303, the controller 306 performs charger detection according to the techniques described herein, and detects that charger 303 is type-1 charging device. Controller 306 then configures portable device 301 (or causes device 301 to be configured) to draw the maximum voltage and current allowed by a type-1 specification and allowed by the portable device and to charge battery 307 accordingly. In another example, when portable device 301 is connected over connecting device 308 to charger 304, the controller 306 performs charger detection according to the techniques described herein, and detects that charger 304 is a type-2 charging device. Controller 306 then configures portable device 301 (or causes device 301 to be configured) to draw the maximum voltage and current allowed by a type-2 specification and allowed by the portable device and to charge battery 307 accordingly.

Figure 4:
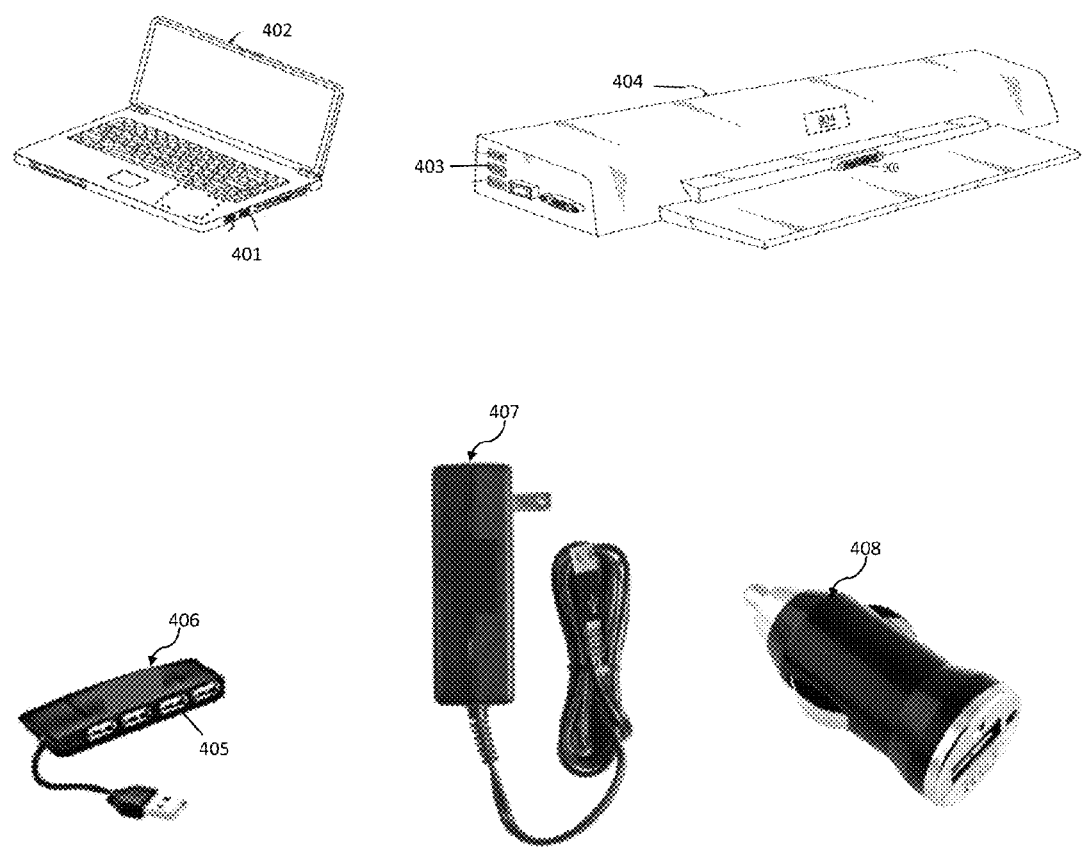
FIG. 4 illustrates example USB charging devices, according to some embodiments.

FIG. 4 illustrates several types of charging devices that may be used in system 300. The charging devices may include, but are not limited to, a USB charging port 401 on a laptop 402, a USB charging port 403 on a docking stations 404, a USB charging port 405 on a USB hub 406, a USB wall charger 407, and a USB car charger 408.

In an embodiment, a portable device may be directly coupled to the charging device. In another embodiment, the portable device may be coupled to the charging device through a USB-to-USB connecting device. USB-to-USB connecting devices may include, but are not limited to, a USB cable, a USB dongle, or a USB adaptor.

Example Alternative Embodiments

Figure 5:
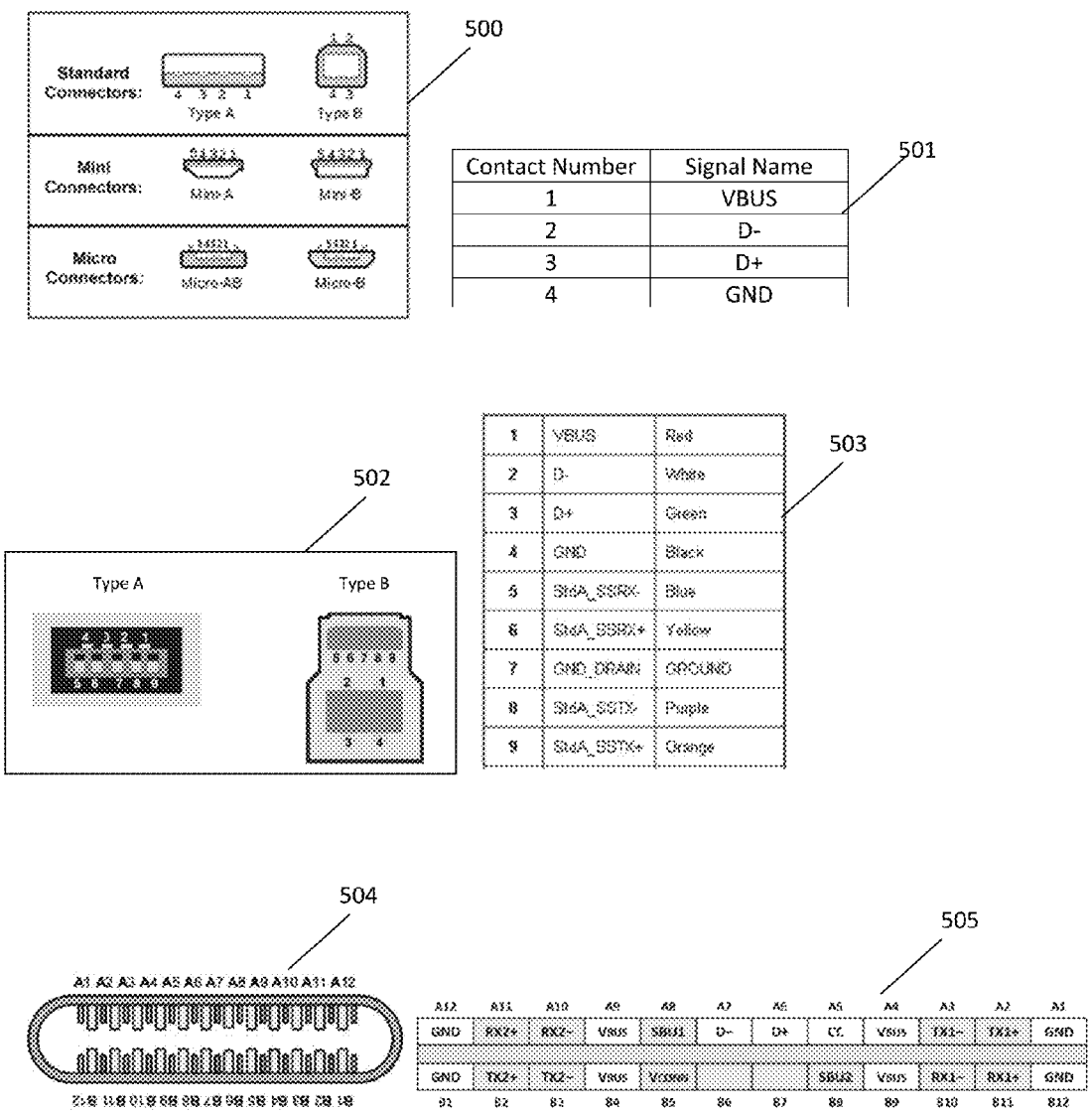
FIG. 5 illustrates example USB connectors, according to some embodiments.

Various portable devices and charging devices may include a USB port conforming to the USB Type-C Specification Revision 1.1 (published Apr. 3, 2015). FIG. 5 illustrates the connections of a Type A, Type B, and Type C connectors. As used herein, the term "connector" refers to a physical interface that is included in a USB connecting device. The mechanical connections of USB 1.x/2.0 Type A and Type B connectors are illustrated in chart 500, with the signal names defined in table 501. The mechanical connections of USB 3.0 Type A and Type B connectors are illustrated in block 502, with the signal names defined in table 503. The mechanical connections of USB Type C connectors is illustrated in block 504, with the signal names defined in table 505. As shown in FIG. 5, the Type C connector includes the VBUS, D+, D−, and GND connectors as implemented on the USB 1.x/2.0/3.0 Type A and Type B connectors.

Figure 6:
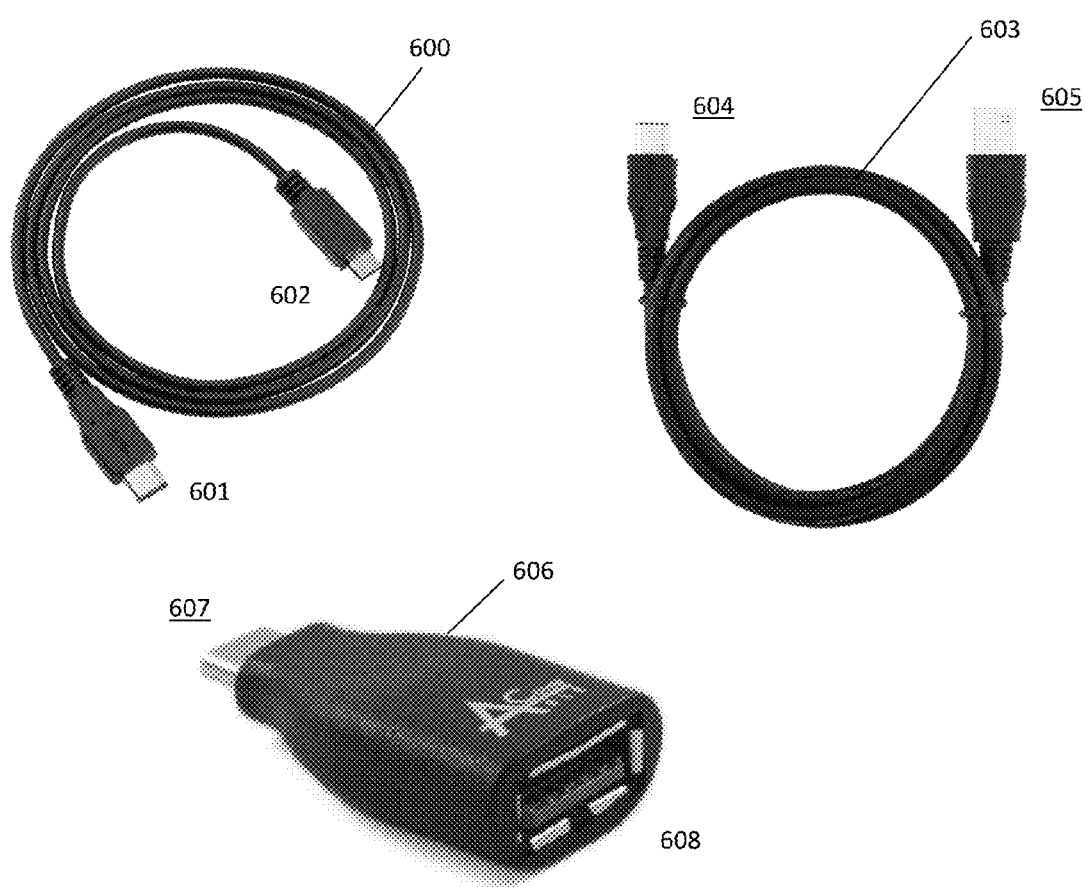
FIG. 6 illustrates example USB adaptors, according to some embodiments.

According to the techniques described herein, portable devices and charging devices can connect between Type A or Type B ports to Type C ports via a Type A or Type B to Type C adaptor. As examples, FIG. 6 illustrates a cable 600 with a USB Type C connector 601 at one end and a USB Type micro-B 2.0 connector 602 at the other end, a cable 603 with a USB Type C connector 604 at one end and a USB Type A 2.0 connector 605 at the other end, and a dongle 606 with a USB Type C connector 607 and one end and a USB Type A connector 608 at the other end. It is noted that there are other combinations of Type A or Type B to Type C adaptors that may be used.

In an example embodiment, a portable device comprising a Type C port may be connected to a charging device comprising a Type A or Type B port over a Type C-to-Type A/B adaptor. According to the techniques described herein, the portable device implements the method 100 of FIG. 1 to configure the portable device to detect whether the charging device conforms to the BC1.2 specification, a type-1 specification, or a type-2 specification. The portable device is then configured to charge at the maximum charging voltage and/or current available from the charging device and allowable for the portable device.

In another example embodiment, a portable device comprising a Type A or Type B port may be connected to a charging device comprising a Type C port over a Type A/B-to-Type C adaptor. According to the techniques described herein, the portable device implements the method 100 of FIG. 1 to configure the portable device to detect whether the charging device conforms to the BC1.2 specification, a type-1 specification, or a type-2 specification. The portable device is then configured to charge at the maximum charging voltage and/or current available from the charging device and allowable for the portable device. In another embodiment, if the charging device does not meet BC1.2 specification, a type-1 specification, and a type-2 specification, the portable device may be configured into a default configuration that allows the portable device to draw the standard 500 mA at 5V from the VBUS, as defined in the USB 2.0 specification.

CONCLUSION

In various embodiments, the techniques described herein provide for configuring a portable device to detect whether the charging device conforms to the BC1.2 specification, a type-1 specification, or a type-2 specification; the portable device is then configured to charge at the maximum charging voltage and/or current available from the charging device and allowable for the portable device. These operations may be performed and/or controlled by hardware components, firmware, and/or combinations thereof. A portable device is considered to be "attached" to a USB port when there is a physical cable (or link) between the two. A portable device is considered to be "connected" to a USB port when it is attached to the port and: (1) it has pulled either the D+ or D− line through a 1.5 kΩ resistor in order to enter Low-Speed, Full-Speed, or High-Speed signaling (for USB 2.0 ports); or (2) when a downstream SuperSpeed termination has been detected at the upstream port (for USB 3.0/3.1 ports). As used herein, the term "coupled to" may mean coupled directly or indirectly through one or more intervening components. Any of the signals provided over various on-die buses described herein may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for controlling the charging of portable devices described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the method(s) herein are shown and described in a particular order, in some embodiments the order of the operations of each method may be altered so that certain operations may be performed in an inverse order or so that certain operation may be performed, at least in part, concurrently and/or in parallel with other operations. In other embodiments, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
  a portable device detecting a Universal Serial Bus (USB) connection to a charging device;
  coupling directly a plurality of inputs of each of a plurality of multiplexers included within the portable device to a plurality of reference voltages and to data lines of the USB connection, wherein the plurality of multiplexers are configured to generate output values based on voltages on the data lines of the USB connection and the plurality of reference voltages;
  the portable device determining whether the charging device conforms to a first charger type, of a plurality of charger types, based on the output values based on the voltages on the data lines of the USB connection and the plurality of reference voltages;
  the portable device determining whether the charging device conforms to a second charger type, of the plurality of charger types, based on the output values based on voltages on the data lines of the USB connection and the plurality of reference voltages, when the portable device determines that the charging device does not conform to the first charger type, wherein the second charger type is different from the first charger type; and
  the portable device determining that the charging device conforms to a third charger type, of the plurality of charger types, based on the output values based on voltages on the data lines of the USB connection and the plurality of reference voltages, when the portable device determines that the charging device does not conform to the first charger type or the second charger type, wherein the third charger type is different from the first charger type and the second charger type,
  wherein the first charger type is BC compliant, the second charger type conforms to a first charging specification that defines BC non-compliant charging current or voltage, and the third charger type conforms to a second charging specification that defines BC non-compliant charging current or voltage.

2. The method of claim 1, further comprising the portable device charging a battery at maximum charging power available from the charging device according to the third charger type.

3. The method of claim 1, wherein the first charging specification defines BC non-compliant charging current and the second charging specification defines BC non-compliant charging voltage.

4. The method of claim 1, further comprising determining whether the charging device conforms to the first charger type, the second charger type, or the third charger type by comparing the voltages on the data lines of the USB connection to a plurality of reference voltages.

5. The method of claim 4, wherein the voltages on the data lines are compared to the plurality of reference voltages using a single comparator.

6. The method of claim 5, wherein comparing the voltages on the data lines comprises:
  comparing a particular reference voltage, of the plurality of reference voltages, to a DP line of the USB connection; and
  comparing the particular reference voltage to a DM line of the USB connection.

7. The method of claim 4, further comprising generating the plurality of reference voltages using a single voltage generator.

8. An integrated circuit (IC) device comprising:
  a plurality of multiplexers, wherein a plurality of inputs to each of the plurality of multiplexers are coupled directly to a plurality of reference voltages and to data lines of a USB port that is connectable to a charging device, and wherein the plurality of multiplexers are configured to generate output values based on voltages on the data lines of the USB port and the plurality of reference voltages;
  a comparator coupled to the outputs of the plurality of multiplexers; and
  a processing logic coupled to the output of the comparator, wherein based on the output values, the processing logic configured at least to:
    determine whether the charging device conforms to a first charger type, of a plurality of charger types;
    determine whether the charging device conforms to a second charger type, of the plurality of charger types, when the processing logic determines that the charging device does not conform to the first charger type, wherein the second charger type is different from the first charger type; and
    determine that the charging device conforms to a third charger type, of the plurality of charger types, when the processing logic determines that the charging device does not conform to the first charger type or the second charger type, wherein the third charger type is different from the first charger type and the second charger type.

9. The IC device of claim 8, wherein the plurality of multiplexers comprise a first multiplexer and a second multiplexer, wherein inputs of the first multiplexer are coupled to a DM line and a DP line of the USB port and a particular reference voltage of the plurality of reference voltages, and wherein inputs of the second multiplexer are coupled to a DM line and a DP line of the USB port and the particular reference voltage.

10. The IC device of claim 9, wherein the first multiplexer is configured to select as output a signal on the DM line when the second multiplexer is configured to select as output the particular reference voltage.

11. The IC device of claim 9, wherein the first multiplexer is configured to select as output a signal on the DP line when the second multiplexer is configured to select as output the particular reference voltage.

12. The IC device of claim 9, wherein the comparator is coupled to outputs of the first multiplexer and the second multiplexer, and wherein the comparator is configured to compare the output signals received from the first multiplexer and the second multiplexer and to generate output data values.

13. The IC device of claim 8, wherein the comparator is configurable to compare a difference between the voltages from the output signals of the first and second multiplexers to an offset voltage and to generate an output data value.

14. The IC device of claim 13, wherein the offset voltage is programmable.

15. The IC device of claim 10, wherein the USB port is configured within a portable device.

16. A system comprising:
   a charging device; and
   a portable device coupled to the charging device over a USB connection, the portable device comprising:
      a plurality of multiplexers, wherein a plurality of inputs to each of the plurality of multiplexers are coupled directly to a plurality of reference voltages and to data lines of the USB connection,
      wherein the portable device is configured to generate output values via the plurality of multiplexers based on voltages on data lines of the USB connection and a plurality of reference voltages;
      determine whether the charging device conforms to a first charger type, of a plurality of charger types, based on the output values based on the voltages on the data lines of the USB connection and the plurality of reference voltages;
      determine whether the charging device conforms to a second charger type, of the plurality of charger types, based on the output values based on the voltages on the data lines of the USB connection and the plurality of reference voltages, when the portable device determines that the charging device does not conform to the first charger type, wherein the second charger type is different from the first charger type; and
      determine that the charging device conforms to a third charger type, of the plurality of charger types, based on the output values based on the voltages on the data lines of the USB connection and the plurality of reference voltages, when the portable device determines that the charging device does not conform to the first charger type or the second charger type, wherein the third charger type is different from the first charger type and the second charger type,
      wherein the first charger type is BC compliant, the second charger type conforms to a first charging specification that defines BC non-compliant charging current or voltage, and the third charger type conforms to a second charging specification that defines BC non-compliant charging current or voltage.

17. The system of claim 16, wherein the portable device is configured to charge a battery at maximum charging power available from the charging device and according to the third charger type.

18. The system of claim 16, wherein the first charging specification defines BC non-compliant charging current and the second charging specification defines BC non-compliant charging voltage.

19. The system of claim 16, wherein the portable device is coupled to the charging device over a USB connecting device that is one of a cable, dongle, and adaptor.

20. The system of claim 19, wherein the USB connecting device includes a USB Type C connector.

* * * * *